US012664978B2

(12) United States Patent
Amid et al.

(10) Patent No.:  US 12,664,978 B2
(45) Date of Patent:      Jun. 23, 2026

(54) FEDERATED KNOWLEDGE DISTILLATION ON AN ENCODER OF A GLOBAL ASR MODEL AND/OR AN ENCODER OF A CLIENT ASR MODEL

(71) Applicant: GOOGLE LLC, Mountain View, CA (US)

(72) Inventors: Ehsan Amid, Mountain View, CA (US);
Rajiv Mathews, Sunnyvale, CA (US);
Shankar Kumar, New York, NY (US);
Jared Lichtarge, Brooklyn, NY (US);
Mingqing Chen, Saratoga, CA (US);
Tien-Ju Yang, Mountain View, CA (US); Yuxin Ding, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 466 days.

(21) Appl. No.: 18/078,782

(22) Filed: Dec. 9, 2022

(65) Prior Publication Data

US 2024/0194192 A1      Jun. 13, 2024

(51) Int. Cl.
G10L 15/16            (2006.01)
G10L 15/06            (2013.01)
(52) U.S. Cl.
CPC ............ G10L 15/16 (2013.01); G10L 15/063 (2013.01)
(58) Field of Classification Search
CPC .............................. G10L 15/16; G10L 15/063
See application file for complete search history.

(56) References Cited

U.S. PATENT DOCUMENTS

2015/0161994 A1*   6/2015   Tang ...................... G10L 15/02
                                                            704/232
2021/0312294 A1   10/2021   Kurata et al.
                    (Continued)

FOREIGN PATENT DOCUMENTS

CN            113779581          12/2021
WO      WO-2022019885 A1 *   1/2022   ............. G06N 3/045

OTHER PUBLICATIONS

S. Si, D. Tao and B. Geng, "Bregman Divergence-Based Regularization for Transfer Subspace Learning," in IEEE Transactions on Knowledge and Data Engineering, vol. 22, No. 7, pp. 929-942, Jul. 2010, doi: 10.1109/TKDE.2009.126. (Year: 2010).*
                    (Continued)

*Primary Examiner* — Richemond Dorvil
*Assistant Examiner* — Adam Michael Weaver
(74) *Attorney, Agent, or Firm* — Gray Ice Higdon

(57)                ABSTRACT

Information can be distilled from a global automatic speech recognition (ASR) model to a client ASR model. Many implementations include using an RNN-T model as the ASR model, where the global ASR model includes a global encoder, a joint network, a prediction network, and where the client ASR model includes a client encoder, the joint network, and the prediction network. Various implementations include using principal component analysis (PCA) while training the global ASR model to learn a mean vector and a set of principal components corresponding to the global ASR model. Additional or alternative implementations include training the client ASR model to generate one or more predicted coefficients of the global ASR model.

20 Claims, 8 Drawing Sheets

(56) References Cited

U.S. PATENT DOCUMENTS

| | | | |
|---|---|---|---|
| 2022/0093083 A1 | 3/2022 | Kurata et al. | |
| 2022/0309340 A1* | 9/2022 | Leal | G06N 3/08 |
| 2022/0383887 A1* | 12/2022 | Wang | G10L 25/51 |

OTHER PUBLICATIONS

S. Si, D. Tao and B. Geng, "Bregman Divergence-Based Regularization for Transfer Subspace Learning," in IEEE Transactions on Knowledge and Data Engineering, vol. 22, No. 7, pp. 929-942, Jul. 2010, doi: 10.1109/TKDE.2009.126. (Year: 2010) (Year: 2010).*

Ghriss et al., "Sentiment-Aware Automatic Speech Recognition Pre-Training for Enhanced Speech Emotion Recognition" arXiv:2201.11826v1 [cs.CL] 6 pages, dated Jan. 27, 2022.

Yoon et al., "Oracle Teacher: Towards Better Knowledge Distillation" arXiv:2111.03664v1 [cs.LG] 10 pages, dated Nov. 5, 2021.

* cited by examiner

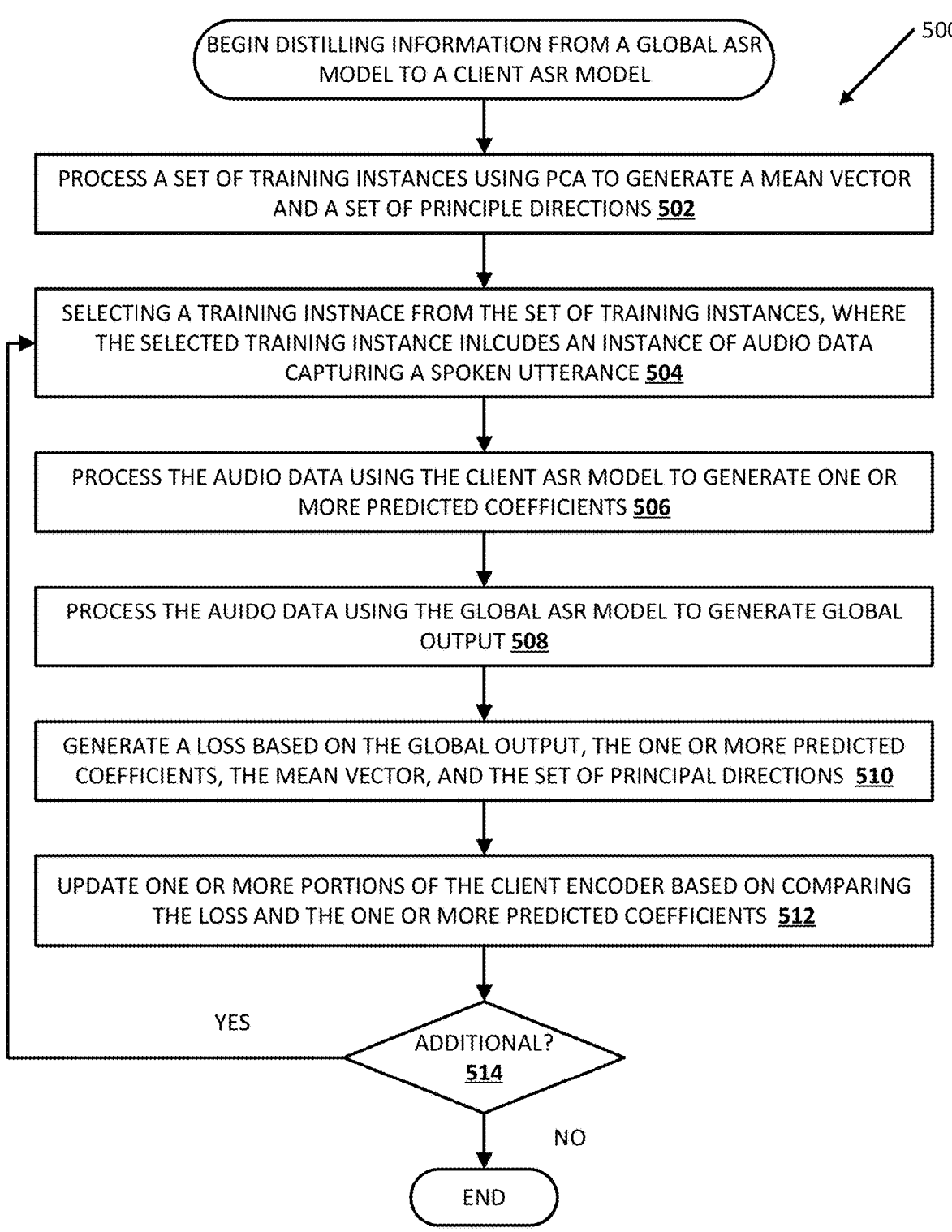

BEGIN DISTILLING INFORMATION FROM A GLOBAL ASR MODEL TO A CLIENT ASR MODEL

500

PROCESS A SET OF TRAINING INSTANCES USING PCA TO GENERATE A MEAN VECTOR AND A SET OF PRINCIPLE DIRECTIONS 502

SELECTING A TRAINING INSTNACE FROM THE SET OF TRAINING INSTANCES, WHERE THE SELECTED TRAINING INSTANCE INLCUDES AN INSTANCE OF AUDIO DATA CAPTURING A SPOKEN UTTERANCE 504

PROCESS THE AUDIO DATA USING THE CLIENT ASR MODEL TO GENERATE ONE OR MORE PREDICTED COEFFICIENTS 506

PROCESS THE AUIDO DATA USING THE GLOBAL ASR MODEL TO GENERATE GLOBAL OUTPUT 508

GENERATE A LOSS BASED ON THE GLOBAL OUTPUT, THE ONE OR MORE PREDICTED COEFFICIENTS, THE MEAN VECTOR, AND THE SET OF PRINCIPAL DIRECTIONS 510

UPDATE ONE OR MORE PORTIONS OF THE CLIENT ENCODER BASED ON COMPARING THE LOSS AND THE ONE OR MORE PREDICTED COEFFICIENTS 512

YES

ADDITIONAL? 514

NO

END

FIG. 5

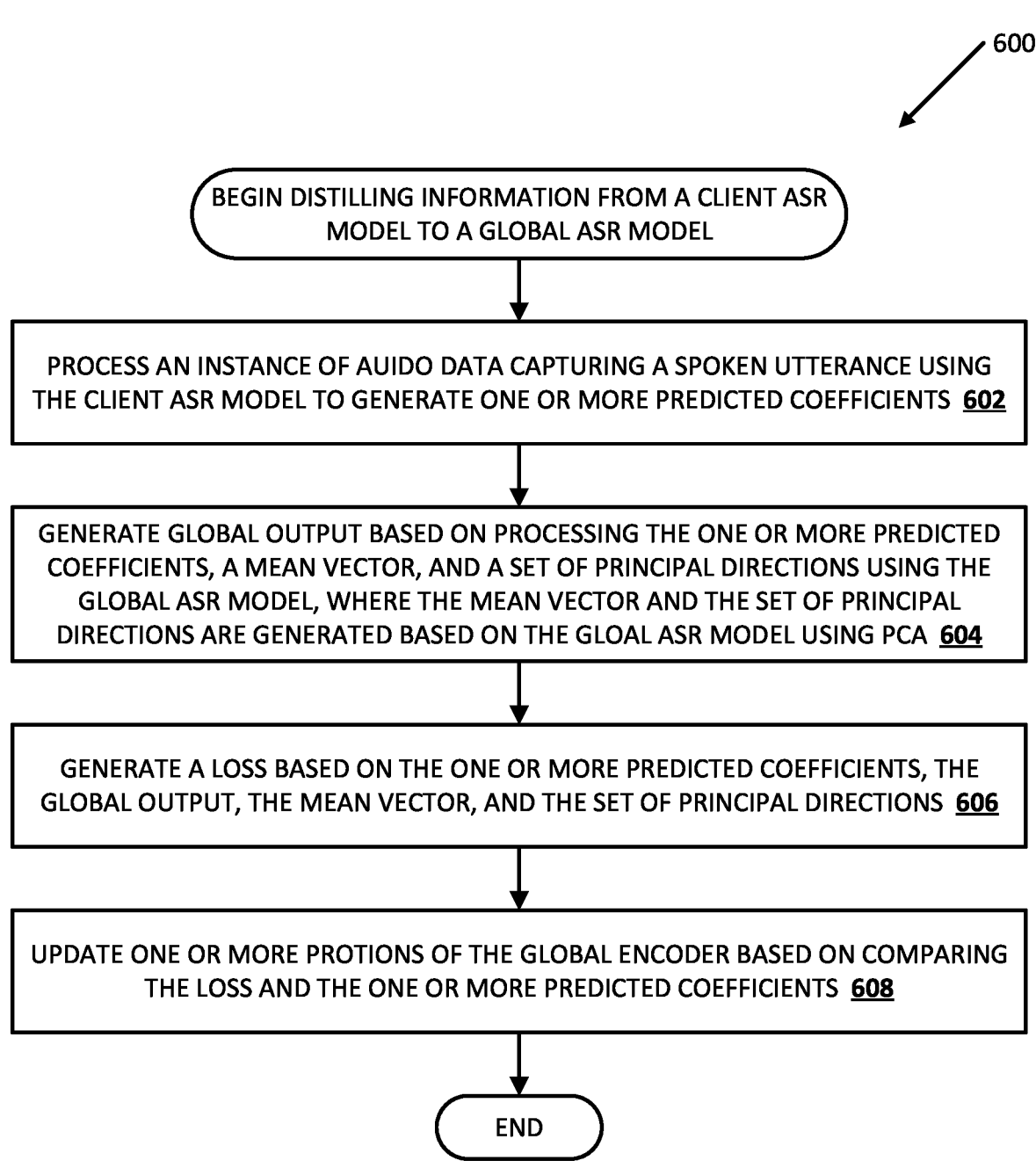

600

BEGIN DISTILLING INFORMATION FROM A CLIENT ASR
MODEL TO A GLOBAL ASR MODEL

PROCESS AN INSTANCE OF AUIDO DATA CAPTURING A SPOKEN UTTERANCE USING
THE CLIENT ASR MODEL TO GENERATE ONE OR MORE PREDICTED COEFFICIENTS 602

GENERATE GLOBAL OUTPUT BASED ON PROCESSING THE ONE OR MORE PREDICTED
COEFFICIENTS, A MEAN VECTOR, AND A SET OF PRINCIPAL DIRECTIONS USING THE
GLOBAL ASR MODEL, WHERE THE MEAN VECTOR AND THE SET OF PRINCIPAL
DIRECTIONS ARE GENERATED BASED ON THE GLOAL ASR MODEL USING PCA 604

GENERATE A LOSS BASED ON THE ONE OR MORE PREDICTED COEFFICIENTS, THE
GLOBAL OUTPUT, THE MEAN VECTOR, AND THE SET OF PRINCIPAL DIRECTIONS 606

UPDATE ONE OR MORE PROTIONS OF THE GLOBAL ENCODER BASED ON COMPARING
THE LOSS AND THE ONE OR MORE PREDICTED COEFFICIENTS 608

END

FIG. 6

FEDERATED KNOWLEDGE DISTILLATION ON AN ENCODER OF A GLOBAL ASR MODEL AND/OR AN ENCODER OF A CLIENT ASR MODEL

BACKGROUND

Data used to train a global model can be distributed across many client devices. Federated learning techniques can train a global model by making use of this distributed data in a privacy friendly manner. For example, each client device can generate a gradient by processing respective data using a local model stored locally at the client device. The gradients can be transmitted, from the client device to remote server(s), without transmitting the respective data utilized in generating the gradients. The global model can be trained, at the remote server(s), using these gradients and without needing the data used to generate the gradients. In other words, data used to train the global model can be kept private by transmitting gradients for use in updating the global model (and not transmitting the data itself).

For example, an automatic speech recognition ("ASR") model can process audio data capturing a spoken utterance to generate a predicted text representation of the spoken utterance. In some implementations, the system can include a global ASR model (e.g., an ASR model stored locally at the server) as well as one or more local ASR models (also referred to herein as 'client ASR models') stored at a corresponding client device remote from the server. In some implementations, the local ASR model(s) can process audio data capturing a given spoken utterance to generate a text representation of the given spoken utterance locally at the client device. For instance, the spoken utterance of "turn off the lights" can be captured in a given instance of audio data via one or more microphones of a mobile phone. A given ASR model, stored locally on the mobile phone, can be used to process the instance of audio data to generate a text representation of "turn off the lights" corresponding to the spoken utterance in the given instance of audio data. Additionally or alternatively, the local ASR model can be updated based on this local processing of audio data. This knowledge gained from the local training of local ASR model(s) can be transferred to the global ASR model and used to train the global ASR model.

SUMMARY

Implementations disclosed herein are directed towards distilling information from a global ASR model to a client ASR model. Additionally or alternatively, implementations disclosed herein are directed toward distilling information from a client ASR model to a global ASR model. In some implementations, knowledge distillation can extract information from a model's predictive distribution. For instance, information learned by the global ASR model can be extracted via knowledge distillation for use in teaching a client ASR model. Similarly, information learned by a client ASR model can be extracted via knowledge distillation for use in teaching the global ASR model.

In some implementations, the global ASR model and/or the client ASR model can be a recurrent neural network transformer ("RNN-T"). In general, an RNN-T includes an encoder, a prediction network, and a joint network. The encoder can process sequential frames of audio data capturing a spoken utterance to generate an encoded representation of the audio frame. The prediction network can process previous output generated by the RNN-T corresponding to one or more previous audio data frames to generate prediction network output. In some implementations, the encoded representation of the audio frame and the prediction network output using the joint network to generate joint output, where the joint output is conditioned on both the encoded representation of the current audio data frame as well as previous predicted output of the RNN-T for the instance of audio data. In some implementations, the joint output can represent the text representation of the spoken utterance. In some other implementations, the joint output can be processed using one or more additional or alternative networks (e.g., a softmax) to generate the predicted text representation of the spoken utterance.

In some implementations, one or more portions of the global ASR model and/or the client ASR model can be reused. For example, the client ASR model can be initialized based on a trained global ASR model. Additionally or alternatively, the global ASR model and the client ASR model can utilize instances of the same prediction network and/or joint network (e.g., the prediction network and/or joint network generated while initially training the global ASR model can be reused in the client ASR model). In some of those implementations, the prediction network and/or the joint network can be frozen while distilling information from a global encoder (of the global ASR model) to a client encoder (of the client ASR model). Similarly, the prediction network and/or the joint network can be frozen while distilling information from the client encoder to the global encoder.

Additionally or alternatively, information in the global ASR model can be encapsulated in soft labels, where the soft labels of the global ASR model can be used as ground truth labels when updating portion(s) of the client ASR model. For example, the global ASR model can process an instance of audio data capturing a spoken utterance to generate a global candidate text representation of the spoken utterance. In some implementations, the global candidate text representation of the training utterance can include a probability and/or score (i.e., a soft label) indicating the likelihood of the candidate text representation of the training utterance being the spoken utterance.

However, using soft labels generated using the global ASR model as ground truth labels for training the client ASR model may limit the amount of knowledge that can be transferred between the client ASR model and the global ASR model. Additionally or alternatively, knowledge can be distilled between the global ASR model and client ASR model based on matching intermediate representations generated using the client ASR model and the global ASR model. In some implementations, principal component analysis ("PCA") techniques can be used by the system to compress the transferable knowledge and/or reduce the dimensionality of the transferable knowledge. The compression loss for the probability distribution of the global ASR model can be minimized by representing the probability distribution of the global ASR model as linear combinations of a set of orthogonal principal directions. For example, the compression loss (i.e., the PCA loss) can be minimized based on minimizing a determined mean vector of the distribution and a set of principal directions. In some of those implementations, Bregman PCA can be used to match Bregman coefficients such that the global ASR model can be used to predict the coefficients of the client ASR model representations.

In some implementations, multiple client ASR models can be used to distill information from each of the client ASR models to the global ASR model. For example, a system can have two client devices, where both client devices have a corresponding client ASR model stored locally at the client device. The system can distill information from the first client encoder to update the global encoder. Subsequent to updating the global encoder based on the first client encoder, the system can update the second client encoder based on the updated global encoder. Additionally or alternatively, the system can distill information from the second client encoder to update the global encoder. Subsequent to updating the global encoder based on the second client encoder, the system can update the first client encoder based on the updated global encoder.

Accordingly, various implementations are directed towards using knowledge distillation to transfer knowledge between a global ASR model and one or more client ASR models. In some implementations, the global ASR model and the client ASR model(s) can be an RNN-T. The global ASR model can include a global encoder, a prediction network, and a joint network. Similarly, the client ASR model can include a client encoder, the prediction network and the joint network. In some implementations, the global ASR model and the client ASR model can include the same prediction network and/or joint network, where the prediction network and/or joint network are frozen while distilling knowledge between the client ASR model and the global ASR model. In other words, only the global encoder portion of the global ASR model and/or the client encoder portion of the client ASR model is updated while transferring knowledge between the global ASR model and the client ASR model. Computing resources (processor cycles, memory, battery, etc.) can be conserved by updating only the encoder portion of the global ASR model and/or the client ASR model instead of updating the entire ASR model.

Furthermore, instead of training the client ASR model to predict the speech recognition output generated by the global ASR model, the client ASR model can be trained to predict Bregman coefficients of the global ASR model. The client encoder to predict Bregman coefficients is smaller than the corresponding global encoder. In other words, the smaller client encoder and corresponding client ASR model use fewer computing resources (e.g., memory, processor cycles, battery, etc.) in comparison to the global encoder and corresponding global ASR model.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5 is a flowchart illustrating an example process of distilling information from a global ASR model to a client ASR model in accordance with various implementations disclosed herein.

FIG. 6 is a flowchart illustrating an example process of distilling information from a client ASR model to a global ASR model in accordance with various implementations disclosed herein.

DETAILED DESCRIPTION

Figure 1:
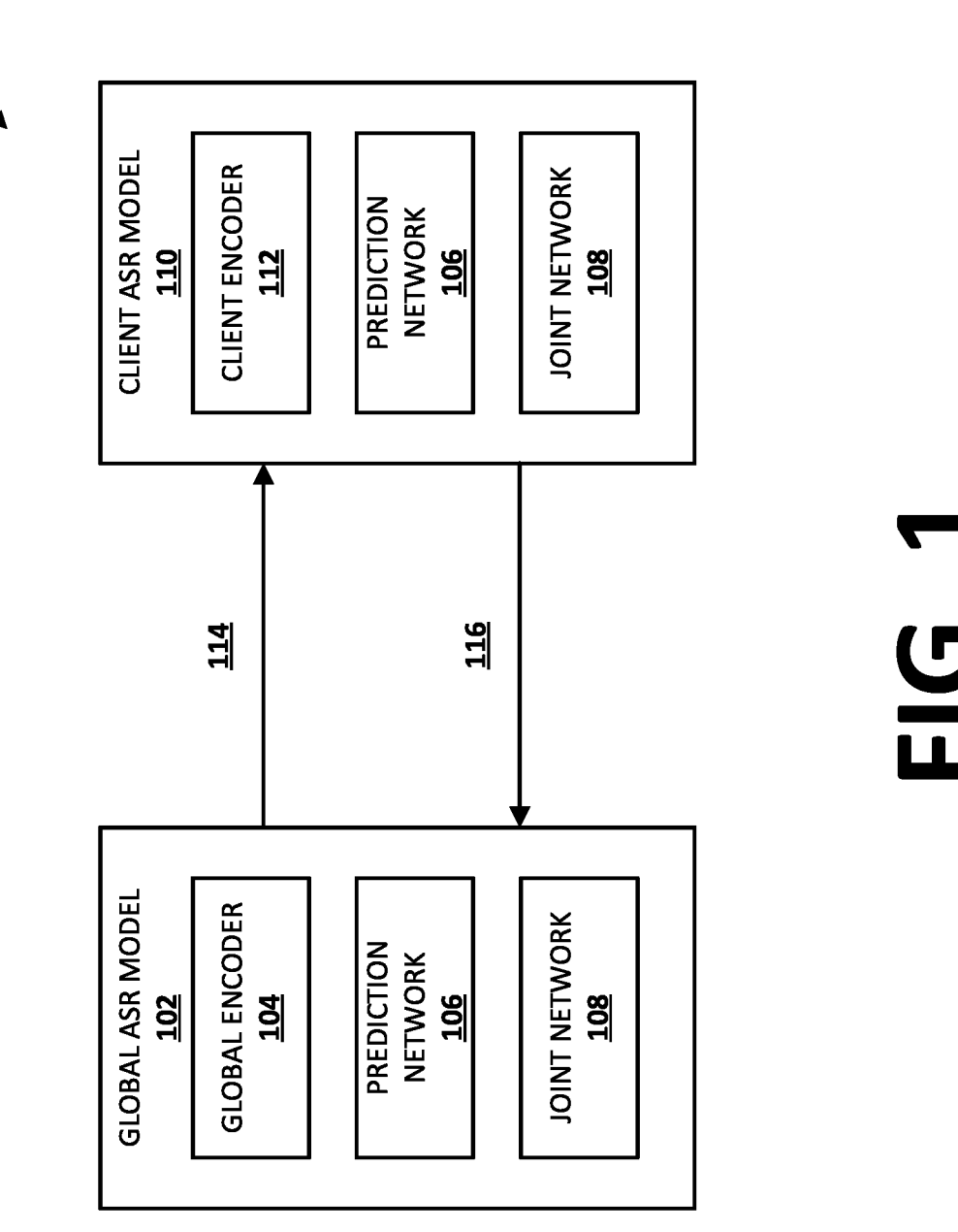
FIG. 1 illustrates an example of a global ASR model and a client ASR model in accordance with various implementations disclosed herein.

Turning now to the figures, FIG. 1 illustrates an example 100 of a global ASR model 102 and a client ASR model 110. Global ASR model 102 is an RNN-T and includes a global encoder 104, a prediction network 106, and a joint network 108. In some implementations, one or more portions of the global ASR model can be reused in the client ASR model. For example, client ASR model 110 includes a client encoder 112, the prediction network 106, and the joint network 108. In some of those implementations, the prediction network 106 and/or the joint network 108 can be frozen while training the global encoder 104 and/or the client encoder 112.

In some implementations, knowledge can be transferred 114 from the global ASR model 102 to update the client ASR model 110. For example, knowledge distilled from the global encoder 104 can be used to update the client encoder 112. An example of distilling knowledge from the global encoder 104 to the client encoder 112 is described herein with respect to FIG. 2. Similarly, knowledge can be transferred 116 from the client ASR model 110 to the global ASR model 102. For example, knowledge distilled from the client encoder 112 can be used to update the global encoder 104. An example of distilling knowledge from the client encoder 112 to the global encoder 104 is described herein with respect to FIG. 3.

Example 100 includes a single client ASR model 110. However, this is merely illustrative. Additional or alternative implementations can include multiple client ASR models 110. For example, global ASR model 102 can be used to transfer knowledge to multiple client ASR models 110. For instance, the global encoder 104 of a remote computing system can be used in updating a first client encoder 112 of a corresponding first client device, a second client encoder 112 of a corresponding second client device, and a third client encoder 112 of a corresponding third client device. In some of those implementations, the prediction networks 106 and joint networks 108 of the remote computing system, the first client device, the second client device, and the third client device can remain frozen while the first client encoder 112, the second client encoder 112, and the third client encoder 112 are updated.

Similarly, multiple client ASR models 110 can transfer information to a given global ASR model 102. For example, a first client encoder 112 of a corresponding first client ASR model 110 can be used to transfer knowledge 116 to the global encoder 104 of a corresponding global ASR model 102. Additionally or alternatively, the prediction network 106 and/or the joint network 108 of the global ASR model 102 can remain frozen while knowledge is being transferred 116 from the first client encoder 112 corresponding to the first client ASR model 110 to the global encoder 104 corresponding to the global ASR model 102. Additionally or alternatively, a second client encoder 112 of a corresponding second client ASR model 110 can be used to transfer knowledge 116 to the global encoder 104 of a corresponding global ASR model 102. Additionally or alternatively, the prediction network 106 and/or the joint network 108 of the global ASR model 102 can remain frozen while knowledge is being transferred 116 from the second client encoder 112 corresponding to the second client ASR model 110 to the global encoder 104 corresponding to the global ASR model 102. In some implementations, subsequent to updating the global encoder 104 based on the first client encoder 112 and/or the second client encoder 112, the global encoder 104 can be used to transfer knowledge 114 to the first client encoder 112, the second client encoder 112, and/or a third client encoder 112 corresponding to a third client ASR model 110.

Figure 2:
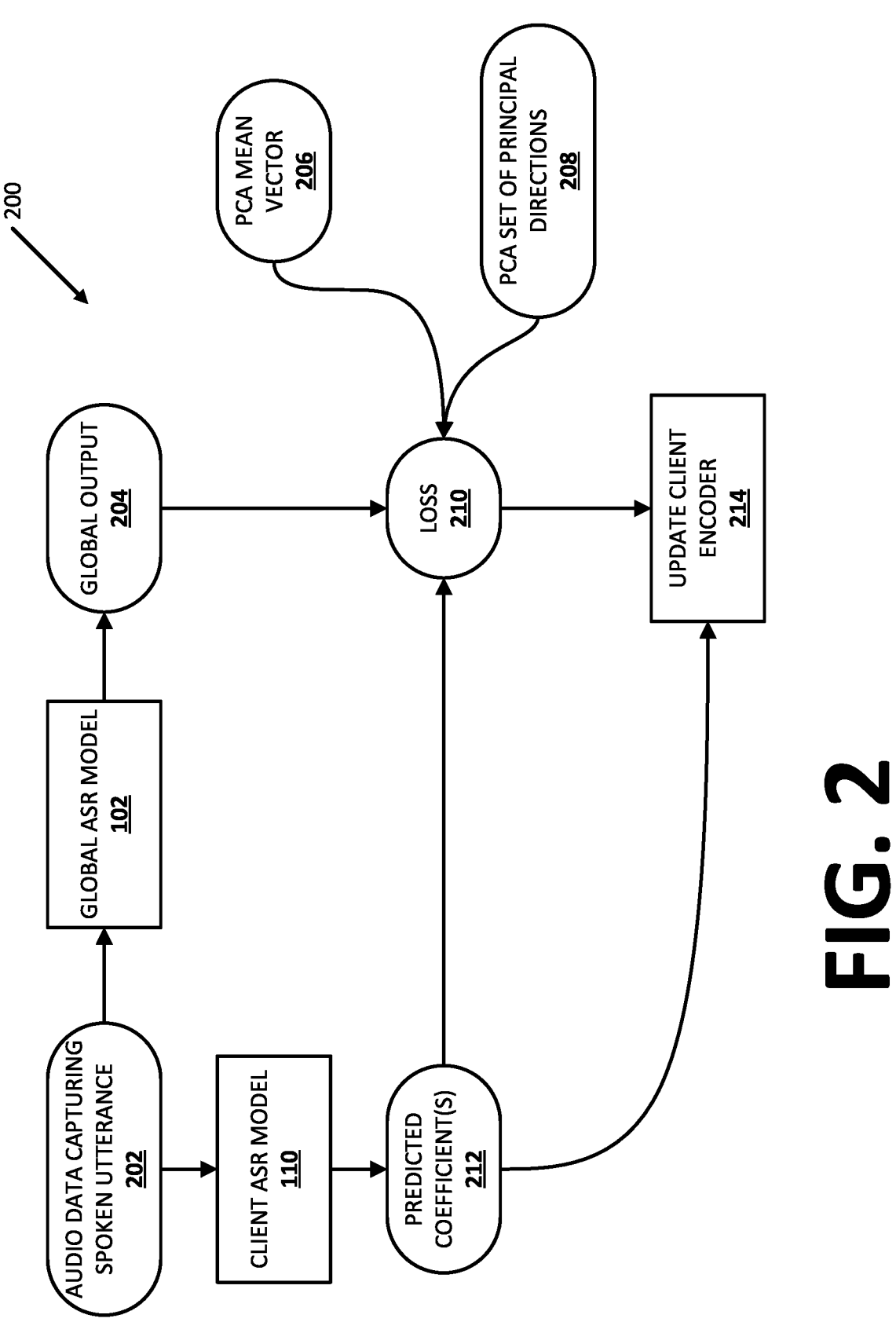
FIG. 2 illustrates an example of distilling information from a global ASR model to a client ASR model in accordance with various implementations disclosed herein.

FIG. 2 illustrates an example 200 of distilling information from a global ASR model to a client ASR model in accordance with various implementations disclosed herein. In some implementations, information can be distilled from the global ASR model to the client ASR model by updating a client encoder portion of the client ASR model based on a global encoder portion of the global ASR model. For example, the system can distill information from the global ASR model 102 to the client ASR model 110, where the client encoder 112 is updated based on the global encoder 104 as described herein with respect to FIG. 1.

Example 200 includes processing audio data capturing a spoken utterance 202 using the global ASR model 102 to generate global output 204. Similarly, the audio data capturing the spoken utterance 202 can be processed using the client ASR model 110 to generate one or more predicted coefficients 212. In some implementations, the one or more predicted coefficients 212 can correspond to predicted coefficients of the client ASR model 110. For example, the predicted coefficients 212 can be based on the client encoder 112 of the client ASR model 110.

In some implementations, principal component analysis ("PCA") can be used to compress the information transferred and/or reduce the dimensionality of the information transferred from the global ASR model 102 to the client ASR model 110. PCA typically includes determining one or more principal components of a set of data and using the principal components to change the basis of the data. Principal components of the set of data (e.g., a collection of points in a real coordinate space) are a sequence of unit vectors, where the ith vector is the direction of a line that best fits the data while being orthogonal to the first i−1 vectors. In other words, PCA can minimize the compression loss of representing a set of points as linear combinations of a set of orthonormal principal directions. A variety of types of PCA can be used in transferring information between the global ASR model 102 and the client ASR model 110. For instance, the system can use traditional PCA, kernel PCA, sparse PCA, logistic PCA, robust PCA, Poisson PCA, Bregman PCA, one or more additional types of PCA, and/or combinations thereof.

In some implementations, the system can use Bregman PCA to determine a PCA set of principal directions 208 and/or a PCA mean vector 206. For instance, the system can process the global encoder 104 to generate the set of principal direction 208 and the mean vector 206. In some of those implementations, the set of principal directions 208 and/or the mean vector 206 can be generated based on an initially trained global ASR model 102 and can be fixed while subsequently transferring information between the global ASR model 102 and the client ASR model 110.

In some implementations, the system can determine a loss 210 between the coefficients of the global ASR model 102 (e.g., the global output 204) and the predicted coefficients 212 generated using the client ASR model 110. In some of those implementations, the system can generate the loss 210 based on the mean vector 206, the set of principal direction 208, the global output 204, and the predicted coefficients 212. Additionally or alternatively, the system can use the loss 210 to update the client encoder 214.

Figure 3:
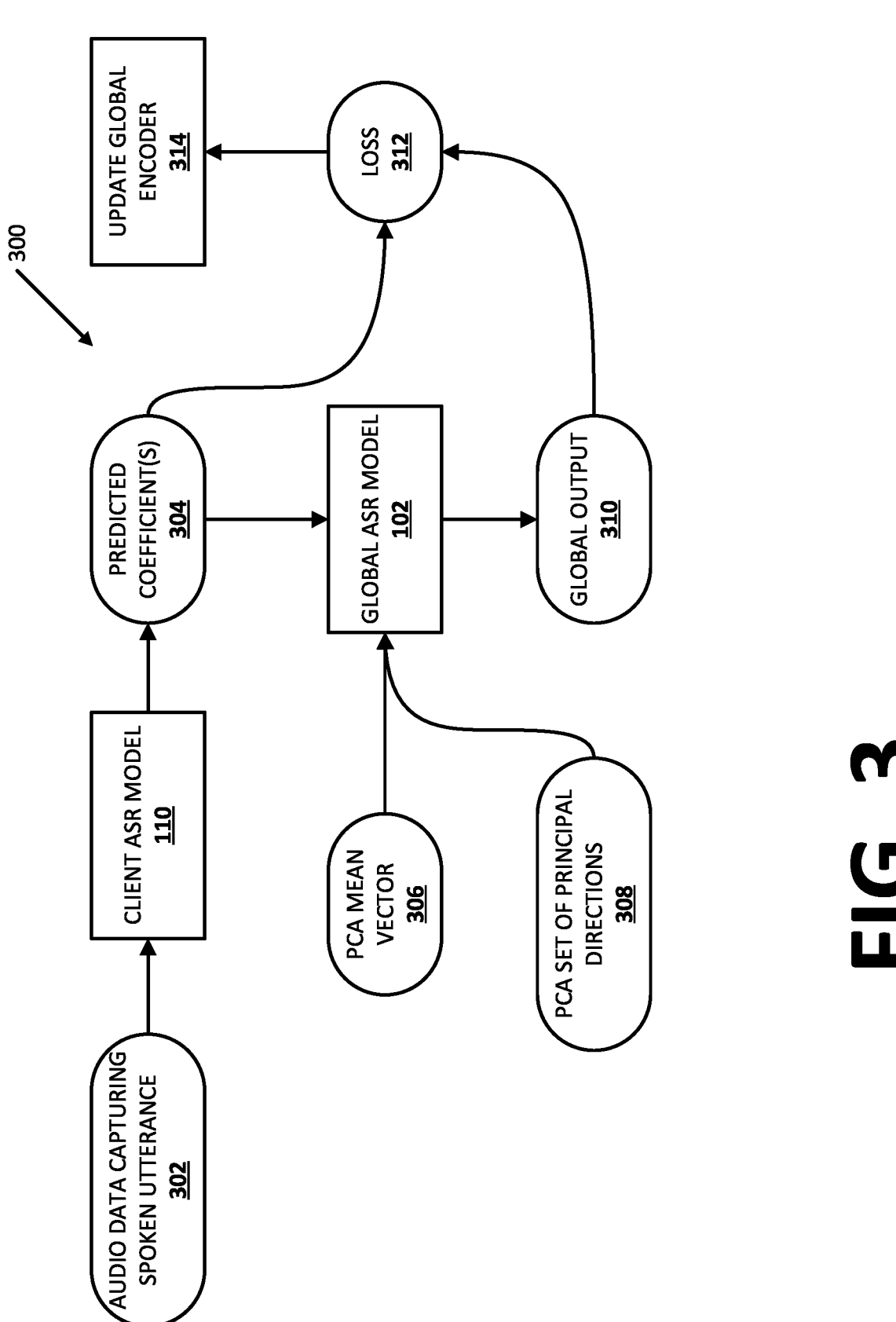
FIG. 3 illustrates an example of distilling information from a client ASR model to a global ASR model in accordance with various implementations disclosed herein.

FIG. 3 illustrates an example 300 of distilling information from a client ASR model to a global ASR model in accordance with various implementations disclosed herein. In some implementations, information can be distilled from the client ASR model to the global ASR model by updating a global encoder of the global ASR model based on a client encoder of the client ASR model. For example, the system can distill information from the client ASR model 110 to the global ASR model 102, where the global encoder 104 is updated based on the client encoder 112 as described herein with respect to FIG. 1.

Example 300 includes processing audio data capturing a spoken utterance 302 using the client ASR model 110 to generate one or more predicted coefficients 304. In some implementations, the system can use Bregman PCA to determine a PCA mean vector 306 and/or a set of principal directions 308. For instance, the system can process the global encoder 104 to generate the set of principal direction 308 and the mean vector 306. In some of those implementations, the set of principal directions 308 and/or the mean vector 306 can be generated based on an initially trained global ASR model 102 and can be fixed while subsequently transferring information between the client ASR model 110 and the global ASR model 102.

In some implementations, the global ASR model 102 can be used to process predicted coefficient(s) 304, the PCA mean vector 306, and the PCA set of principal directions 308 to generate global output 310. Additionally or alternatively, the predicted coefficients 304 and the global output 310 can be used to generate loss 312. In some implementations, the global encoder can be updated based on the loss 312.

Figure 4:
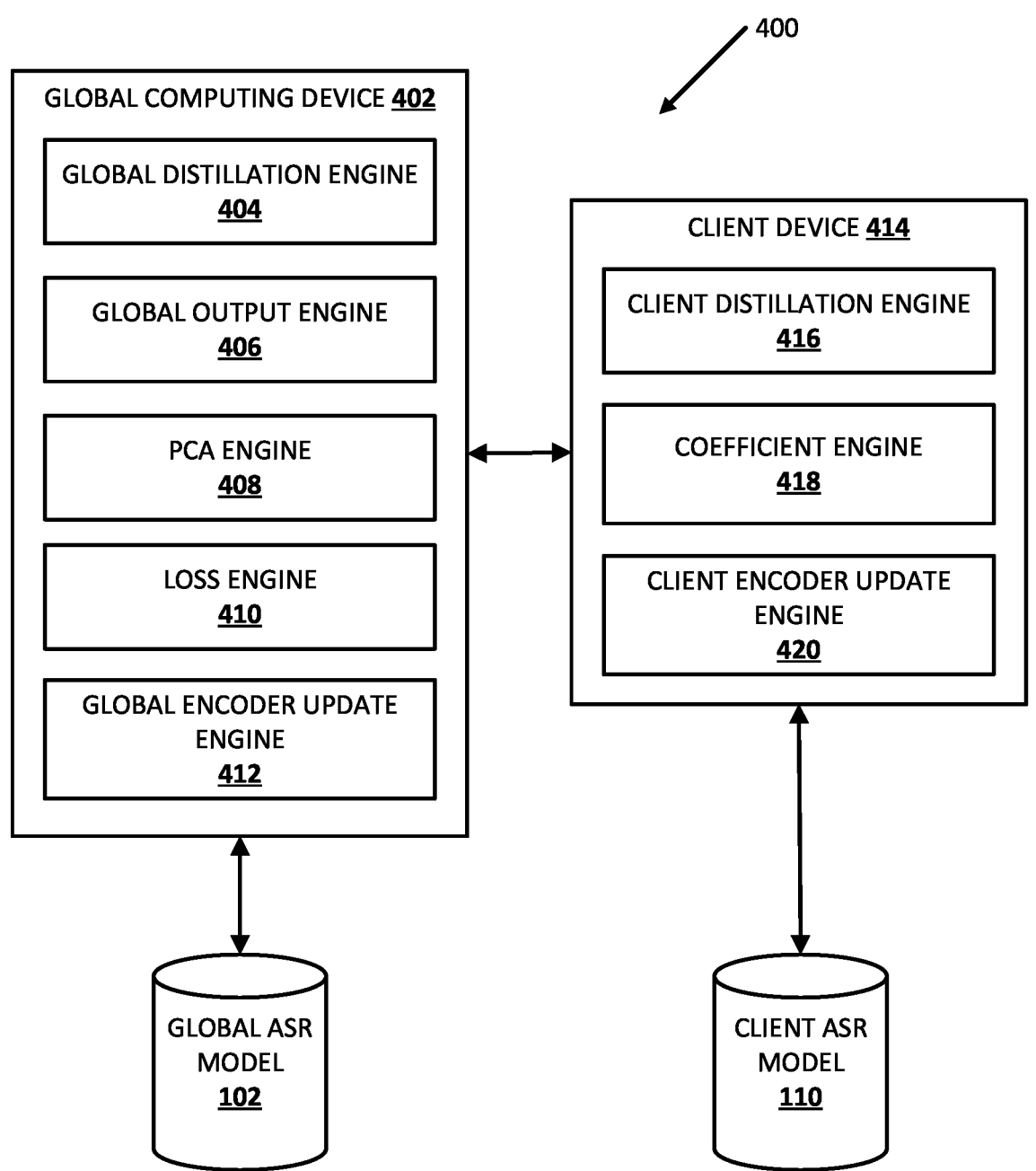
FIG. 4 illustrates an example environment in which various implementations disclosed herein may be implemented.

FIG. 4 illustrates an example environment 400 in which various implementations disclosed herein may be implemented. The example environment 400 includes a global computing device 402 which can include global distillation engine 404, global output engine 406, PCA engine 408, loss engine 410, global encoder update engine 412, and/or additional or alternative engine(s) (not depicted). Additionally or alternatively, global computing device 402 may be associated with global ASR model 102 and/or additional or alternative component(s) (not depicted). Similarly, the example environment 400 includes client device 414 which can include client distillation engine 416, coefficient engine 418, client encoder update engine 420, and/or additional or alternative engine(s) (not depicted). Additionally or alternatively, client device 414 may be associated with client ASR model 110 and/or additional or alternative component(s) (not depicted).

In some implementations, global computing device 402 and/or client device 414 may include user interface input/output devices (not depicted), which may include, for example, a physical keyboard, a touch screen (e.g., implementing a virtual keyboard or other textual input mechanisms), a microphone, a camera, a display screen, and/or speaker(s). The user interface input/output devices may be incorporated with one or more computing systems of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of global computing device 402 and/or client device 414 may be implemented on a computing system that also contains the user interface input/output devices.

Some non-limiting examples of global computing device 402 and/or client device 414 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Global computing device 402 and/or client device 414 may include one or more memories for storage of data and software applications, one or more processors for accessing data and executing applications, and other components that facilitate communication over a network. The operations performed by global computing device 402 and/or client device 414 may be distributed across multiple computing devices. For example, computing programs running on one or more computers in one or more locations can be coupled to each other through a network.

In some implementations, global distillation engine 404 can be used to transfer knowledge from global ASR model 102 to one or more client ASR models 110. Client distillation engine 416 can be used to distill information from a client encoder portion of the client ASR model 110 to the global encoder portion of the global ASR model 102. For example, the global distillation engine 404 can transfer knowledge from the global ASR model to the client ASR model in accordance with FIG. 2 described herein.

Global output engine 406 can be used to generate global output. For example, global output engine 406 can process audio data using global ASR model 102 to generate global output 204 as described herein with respect to FIG. 2. Additionally or alternatively, PCA engine 408 can be used to generate a PCA mean vector and/or a PCA set of principal directions. For instance, PCA engine 408 can be used to generate PCA mean vector 206 and/or a PCA set of principal directions 208 as described herein with respect to FIG. 2. In some implementations, PCA engine 408 can generate the PCA mean vector 206 and/or the PCA set of principal directions 208 while the global ASR model 102 is initially being trained. In some of those implementations, the system does not update the PCA mean vector 206 and/or the PCA set of principal directions 208 generated while initially training the global ASR model 102 while transferring knowledge between the given global ASR model 102 and one or more client ASR models 110. In other words, the PCA engine 408 generates the PCA mean vector 206 and/or the PCA set of principal directions 208 based on initially training the global ASR model 102, but the PCA engine 408 will not update the PCA mean vector 206 and/or the PCA set of principal directions 208 based on the knowledge transferred between the global ASR model 102 and the client ASR model(s) 110. In some other implementations, the PCA engine 408 can generate an updated PCA mean vector and/or an updated PCA set of principal directions based on processing the global ASR model 102 after the global ASR model 102 is updated.

In some implementations, loss engine 410 can be used by the system to generate a loss, where the loss can be used to update the global ASR model 102 and/or the client ASR model 110. In some implementations, loss engine 410 can be used to generate loss 210 described herein with respect to FIG. 2 and/or loss 312 described herein with respect to FIG. 3.

Additionally or alternatively, global encoder update engine 412 can update the global ASR model 102 based on knowledge transferred from one or more client ASR models 110. In some implementations, global encoder update engine 412 can be used to update a global encoder portion of the global ASR model 102, where a prediction network and/or joint network portion of the global ASR model remain frozen.

Client distillation engine 416 can be used to distill information from a client encoder portion of the client ASR model 110 to the global encoder portion of the global ASR model 102. For example, the client distillation engine 416 can transfer knowledge from the client ASR model to the global ASR model in accordance with FIG. 3 described herein.

In some implementations, coefficient engine 418 can process audio data capturing a spoken utterance using the client ASR model 110 to generate one or more predicted coefficients. In some implementations, instead of training the client ASR model 110 to generate a predicted text representation of a spoken utterance captured in audio data, the client ASR model 110 can be trained to generate predicted coefficients of the global ASR model 102. In some of those implementations, when the client ASR model is trained to predict coefficient(s) of the global ASR model and not candidate text representation(s) of a spoken utterance, the client encoder portion of the client ASR model can be smaller than the corresponding global encoder portion of the global ASR model. For example, coefficient engine 418 can be used to generate predicted coefficient(s) 304 described herein with respect to FIG. 3.

In some implementations, client encoder update engine 420 can be used to update the client encoder portion of the client ASR model 110. In some implementations, client encoder update engine 420 can update the client encoder based on comparing a loss generated using loss engine 410 with one or more coefficients generated using coefficient engine 418.

FIG. 5 is a flowchart illustrating an example process of 500 of distilling information from a global ASR model to a client ASR model in accordance with various implementations disclosed herein. For convenience, the operations of the flowchart are described with reference to a system that performs the operations. This system may include various components of various computer systems, such as one or more components of global computing device 402, client device 414, client device 702, and/or computing system 810. Moreover, while operations of process 500 are shown in a particular order, this is not meant to be limiting. One or more operations may be reordered, omitted, and/or added.

The system begins distilling information from a global ASR model to a client ASR model. At block 502, the system processes a set of training instances using PCA to generate a mean vector and a set of principal directions. In some implementations, the system can use Bregman PCA to generate the mean vector and the set of principal directions corresponding to the set of training instances. In some of those implementations, the global ASR model can initially be trained using an initial set of training instances. The system can generate the mean vector and the set of principal directions based on processing the set of initial training instances using PCA. Additionally or alternatively, the mean vector and the set of principal directions corresponding to the global ASR model can be fixed subsequent to the initial generation based on the set of initial training instances. In other words, the same mean vector and set of principal directions can be used in subsequent Bregman PCA calculations for the global ASR model, without updating the mean vector and/or set of principal directions based on an additional training of the global ASR model. In some implementations, the system can use the PCA mean vector 206 and/or the PCA set of principal directions 208 described herein with respect to FIG. 2.

At block 504, the system selects a training instance from the set of training instances, where the selected training instance includes an instance of audio data capturing a spoken utterance. For example, a given training instance can include audio data capturing Mary speaking the utterance "Assistant, turn on the kitchen lights", and a text representation of the spoken utterance of "Assistant, turn on the kitchen lights".

At block 506, the system processes the audio data using the client ASR model to generate one or more predicted coefficients. In some implementations, the system can generate the one or more predicted coefficients while processing the audio data portion of the selected training instance using the client ASR model to generate a candidate client text representation of the spoken utterance, where the one or more predicted coefficients can be coefficients of a client encoder of the client ASR model. In some implementations, the system can use one or more predicted coefficients 212 as described with respect to FIG. 2.

At block 508, the system processes the audio data using the global ASR model to generate global output. In some implementations, the global output can include a candidate global text representation of the spoken utterance of the selected training instance and/or a set of global predicted coefficients corresponding to the global encoder of the global ASR model, where the global predicted coefficients are an intermediate representation of the global encoder. In some implementations, the system can use global output 204 as described with respect to FIG. 2.

At block 510, the system generates a loss based on the global output, the one or more predicted coefficients, the mean vector, and the set of principal directions. In some implementations, the loss can be loss 210 described herein with respect to FIG. 2. In some implementations, the loss can be generated using loss engine 410 described herein with respect to FIG. 4.

At block 512, the system updates one or more portions of the client encoder based on comparing the generated loss and the one or more predicted coefficients. For example, the client encoder can be updated in accordance with update client encoder 214 as described herein with respect to FIG. 2.

At block 514, the system determines whether to process an additional training instance from the set of training instances. If so, the system goes back to block 504, selects an additional training instance from the set of training instances, and proceeds to blocks 506, 508, 510, and 512 based on the additional training instance. If not, the process ends. In some implementations, the system can determine whether to process an additional training instance based on whether there are any unprocessed training instances in the set of training instances, whether a threshold number of training instances have been processed, whether a threshold duration of time has elapsed, whether one or more additional or alternative conditions have been satisfied, and/or combinations thereof.

FIG. 6 is a flowchart illustrating an example process of 600 of distilling information from a client ASR model to a global ASR model in accordance with various implementations disclosed herein. For convenience, the operations of the flowchart are described with reference to a system that performs the operations. This system may include various components of various computer systems, such as one or more components of global computing device 402, client device 414, client device 702, and/or computing system 810. Moreover, while operations of process 600 are shown in a particular order, this is not meant to be limiting. One or more operations may be reordered, omitted, and/or added.

The system begins distilling information from a client ASR model to a global ASR model. At block 602, the system processes an instance of audio data capturing a spoken utterance using the client ASR model to generate one or more predicted coefficients. In some implementations, the one or more predicted coefficients can represent weights of the client ASR model. In some of those implementations, the one or more predicted coefficients can represent weights of the client encoder portion of the client ASR model. Additionally or alternatively, the one or more predicted coefficients may be an intermediate step generated while the client ASR model processes the instance of audio data to generate a candidate client text representation of the spoken utterance captured in the audio data. In some implementations, the system can process the instance of audio data capturing a spoken utterance 302 described herein with respect to FIG. 3.

At block 604, the system generates global output based on processing the one or more predicted coefficients, a mean vector, and a set of principal directions using the global ASR model, where the mean vector and the set of principal directions are generated based on the global model using PCA. In some implementations, the system can use PCA mean vector 306, PCA set of principal directions 308, and/or one or more predicted coefficients 304 in generating global output 310 in accordance with FIG. 3 described herein.

At block 606, the system generates a loss based on the one or more predicted coefficients, the global output, the mean vector, and the set of principal directions. In some implementations, the system can generate loss 312 described herein with respect to FIG. 3.

At block 608, the system updates one or more portions of the global encoder based on comparing the loss and the one or more predicted coefficients. In some implementations, the system can update the global encoder based on update global encoder 314 as described with respect to FIG. 3 herein.

Figure 7:
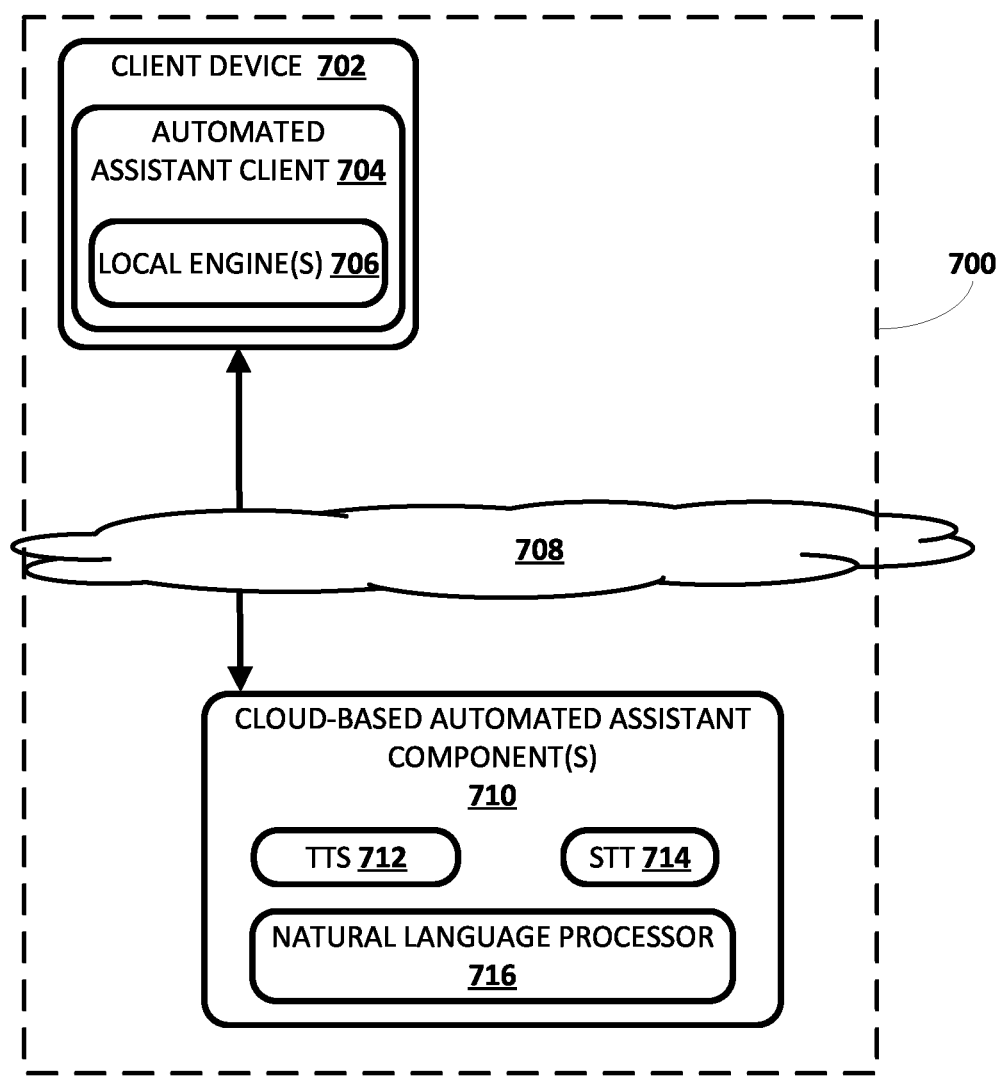
FIG. 7 illustrates another example environment in which various implementations disclosed herein may be implemented.

Turning now to FIG. 7, an example environment is illustrated where various implementations can be performed. FIG. 7 is described initially, and includes a client computing device 702, which executes an instance of an automated assistant client 704. One or more cloud-based automated assistant components 710 can be implemented on one or more computing systems (collectively referred to as a "cloud" computing system) that are communicatively coupled to client device 702 via one or more local and/or wide area networks (e.g., the Internet) indicated generally at 708.

An instance of an automated assistant client 704, by way of its interactions with one or more cloud-based automated assistant components 710, may form what appears to be, from the user's perspective, a logical instance of an automated assistant 700 with which the user may engage in a human-to-computer dialog. An instance of such an automated assistant 700 is depicted in FIG. 7. It thus should be understood that in some implementations, a user that engages with an automated assistant client 704 executing on client device 702 may, in effect, engage with his or her own logical instance of an automated assistant 700. For the sakes of brevity and simplicity, the term "automated assistant" as used herein as "serving" a particular user will often refer to the combination of an automated assistant client 704 executing on a client device 702 operated by the user and one or more cloud-based automated assistant components 710 (which may be shared amongst multiple automated assistant clients of multiple client computing devices). It should also be understood that in some implementations, automated assistant 700 may respond to a request from any user regardless of whether the user is actually "served" by that particular instance of automated assistant 700.

The client computing device 702 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 702 may optionally operate one or more other applications that are in addition to automated assistant client 704, such as a message exchange client (e.g., SMS, MMS, online chat), a browser, and so forth. In some of those various implementations, one or more of the other applications can optionally interface (e.g., via an application programming interface) with the automated assistant 700, or include their own instance of an automated assistant application (that may also interface with the cloud-based automated assistant component(s) 710).

Automated assistant 700 engages in human-to-computer dialog sessions with a user via user interface input and output devices of the client device 702. To preserve user privacy and/or to conserve resources, in many situations a user must often explicitly invoke the automated assistant 700 before the automated assistant will fully process a spoken utterance. The explicit invocation of the automated assistant 700 can occur in response to certain user interface input received at the client device 702. For example, user interface inputs that can invoke the automated assistant 700 via the client device 702 can optionally include actuations of a hardware and/or virtual button of the client device 702. Moreover, the automated assistant client can include one or more local engines 706, such as an invocation engine that is operable to detect the presence of one or more spoken invocation phrases. The invocation engine can invoke the automated assistant 700 in response to detection of one of the spoken invocation phrases. For example, the invocation engine can invoke the automated assistant 700 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 702, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 700. As used herein, "invoking" the automated assistant 700 can include causing one or more previously inactive functions of the automated assistant 700 to be activated. For example, invoking the automated assistant 700 can include causing one or more local engines 706 and/or cloud-based automated assistant components 710 to further process audio data frames based on which the invocation phrase was detected, and/or one or more following audio data frames (whereas prior to invoking no further processing of audio data frames was occurring). For instance, local and/or cloud-based components can process captured audio data using a two-pass ASR model in response to invocation of the automated assistant 700.

The one or more local engine(s) 706 of automated assistant 700 are optional, and can include, for example, the invocation engine described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 702 is relatively constrained in terms of computing resources (e.g., processor cycles, memory, battery, etc.), the local engines 706 may have limited functionality relative to any counterparts that are included in cloud-based automated assistant components 710.

Cloud-based automated assistant components 710 leverage the virtually limitless resources of the cloud to perform more robust and/or more accurate processing of audio data, and/or other user interface input, relative to any counterparts of the local engine(s) 706. Again, in various implementations, the client device 702 can provide audio data and/or other data to the cloud-based automated assistant components 710 in response to the invocation engine detecting a spoken invocation phrase, or detecting some other explicit invocation of the automated assistant 700.

The illustrated cloud-based automated assistant components 710 include a cloud-based TTS module 712, a cloud-based STT module 714, a natural language processor 716, a dialog state tracker 718, and a dialog manager 720. In some implementations, one or more of the engines and/or modules of automated assistant 700 may be omitted, combined, and/or implemented in a component that is separate from automated assistant 700. Further, in some implementations automated assistant 700 can include additional and/or alternative engines and/or modules. Cloud-based STT module 714 can convert audio data into text, which may then be provided to natural language processor 716.

Cloud-based TTS module 712 can convert textual data (e.g., natural language responses formulated by automated assistant 700) into computer-generated speech output. In some implementations, TTS module 712 may provide the computer-generated speech output to client device 702 to be output directly, e.g., using one or more speakers. In other implementations, textual data (e.g., natural language responses) generated by automated assistant 700 may be provided to one of the local engine(s) 706, which may then convert the textual data into computer-generated speech that is output locally.

Natural language processor 716 of automated assistant 700 processes free form natural language input and generates, based on the natural language input, annotated output for use by one or more other components of the automated assistant 700. For example, the natural language processor 716 can process natural language free-form input that is textual input that is a conversion, by STT module 714, of audio data provided by a user via client device 702. The generated annotated output may include one or more annotations of the natural language input and optionally one or more (e.g., all) of the terms of the natural language input.

In some implementations, the natural language processor 716 is configured to identify and annotate various types of grammatical information in natural language input. In some implementations, the natural language processor 716 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 716 may additionally and/or alternatively include a coreference resolver (not depicted) configured to group, or "cluster," references to the same entity based on one or more contextual cues. For example, the coreference resolver may be utilized to resolve the term "there" to "Hypothetical Cafe" in the natural language input "I liked Hypothetical Café last time we ate there." In some implementations, one or more components of the natural language processor 716 may rely on annotations from one or more other components of the natural language processor 716. In some implementations, in processing a particular natural language input, one or more components of the natural language processor 716 may use related prior input and/or other related data outside of the particular natural language input to determine one or more annotations.

Figure 8:
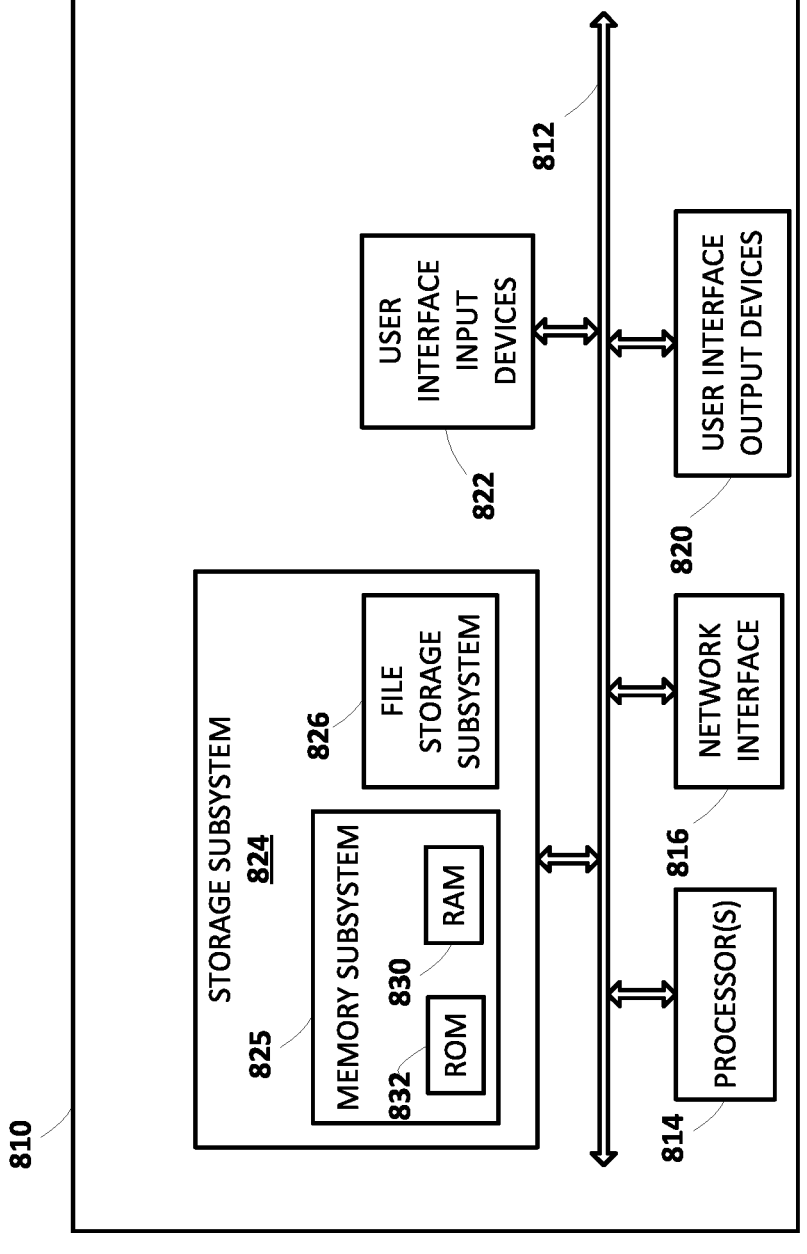
FIG. 8 illustrates an example architecture of a computing device.

FIG. 8 is a block diagram of an example computing device 810 that may optionally be utilized to perform one or more aspects of techniques described herein. In some implementations, one or more of a client computing device, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of one or more of the processes of FIG. 5 and/or FIG. 6 as well as to implement various components depicted in FIG. 4 and/or FIG. 7.

These software modules are generally executed by processor 814 alone or in combination with other processors. Memory 825 used in the storage subsystem 824 can include a number of memories including a main random access memory ("RAM") 830 for storage of instructions and data during program execution and a read only memory ("ROM") 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method includes distilling information from a global automatic speech recognition ("ASR") model to generate a client ASR model. In some implementations, the global ASR model includes a global encoder, a prediction mode, and a joint network. In some implementations, the client ASR model includes a client encoder, the prediction model, and the joint network. In some implementations, distilling the global ASR model to generate the client ASR model includes processing a set of training instances using principal component analysis ("PCA") to generate (a) a mean vector for the set of training instances and (b) a set of principal directions for the set of training instances. In some implementations, for each of a plurality of training instances in the set of training instances and until one or more conditions are satisfied, the method includes selecting a given training instance, wherein the given training instance includes an instance of audio data capturing a spoken utterance. In some implementations, the method includes processing the instance of audio data capturing the spoken utterance using the client ASR model to generate one or more predicted coefficients corresponding to the given training instance. In some implementations, the method includes processing the instance of audio data capturing the spoken utterance using the global ASR model to generate global output. In some implementations, the method includes generating a loss based on the global output, the one or more coefficients, the mean vector for the set of training instances, and the set of principal directions for the set of training instances. In some implementations, the method includes updating one or more portions of the client encoder based on comparing the loss and the one or more predicted coefficients.

These and other implementations of the technology can include one or more of the following features.

In some implementations, the method further includes processing a further instance of audio data capturing a further spoken utterance using the global ASR model to generate a global text representation of the spoken utterance. In some implementations, the method further includes processing the further instance of audio data using the client ASR model to generate a client text representation of the spoken utterance. In some implementations, the method further includes updating one or more portions of the client encoder based on comparing the global text representation of the spoken utterance and the client text representation of the spoken utterance. In some versions of those implementations, updating the one or more proportions of the client encoder based on comparing the global text representation of the spoken utterance and the client text representation of the spoken utterance includes freezing the joint network of the client ASR model and freezing the prediction network of the client ASR model.

In some implementations, the global ASR model is a recurrent neural network transformer ("RNN-T") and wherein the client ASR model is an additional RNN-T.

In some implementations, processing the set of training instances using PCA to generate (a) the mean vector for the set of training instances and (b) the set of principal directions for the set of training instances includes processing the set of training instances using Bregman PCA to generate (a) the mean vector for the set of training instances and (b) the set of principal directions for the set of training instances.

In some implementations, the client ASR model is stored locally at a client device and wherein the global ASR model is stored at a server remote from the client device. In some versions of those implementations, storage of the global encoder takes a first value of memory, storage of the client encoder takes a second value of memory, and the first value of memory is greater than the second value of memory.

In some implementations, the global ASR model is initially trained using a set of non-private training data.

In some implementations, the method further includes distilling information from the client ASR model to the global ASR model. In some implementations, distilling information from the client ASR model to the global ASR model further includes processing an additional instance of audio data capturing an additional spoken utterance using the client ASR model to generate one or more additional predicted coefficients. In some implementations, the method further includes generating additional global output based on processing the one or more additional predicted coefficients, the mean vector, and the set of principal directions using the global ASR model. In some implementations, the method further includes generating an additional loss based on the one or more additional predicted coefficients, the additional global loss, the mean vector, and the set of principal directions. In some implementations, the method further includes updating one or more portions of the global encoder based on comparing the additional loss and the one or more additional predicted coefficients.

In some implementations, a method implemented by one or more processors is provided, the method includes distilling information from a client automatic speech recognition ("ASR") model to a global ASR model. In some implementations, the client ASR model includes a client encoder, a prediction model, and a joint network. In some implementations, the global ASR model includes a global encoder, the prediction model, and the joint network. In some implementations, distilling information from the client ASR model to the global ASR model includes processing an instance of audio data capturing a spoken utterance using the client ASR model to generate one or more predicted coefficients corresponding to the spoken utterance. In some implementations, the method further includes generating global output based on processing the one or more predicted coefficients, a mean vector of the global ASR model, a set of principal directions of the global ASR model using the global ASR model, where the mean vector of the global ASR model and the set of principal directions for the global ASR model are generated using principal component analysis ("PCA"). In some implementations, the method further includes generating a loss based on the one or more predicted coefficients, the global loss, the mean vector of the global ASR model, and the set of principal directions of the global ASR model. In some implementations, the method further includes updating one or more portions of the global encoder based on comparing the loss and the one or more predicted coefficients.

These and other implementations of the technology can include one or more of the following features.

In some implementations, the method further includes distilling information from an additional client ASR model to the global ASR model. In some implementations, distilling information from the additional client ASR model to the global ASR model includes processing an additional instance of audio data capturing an additional spoken utterance using the additional client ASR model to generate one or more additional predicted coefficients corresponding to the additional spoken utterance. In some implementations, the method further includes generating additional global output based on processing the one or more additional predicted coefficients, the mean vector of the global ASR model, and the set of principal directions of the global ASR model using the global ASR model. In some implementations, the method further includes generating an additional loss based on the one or more additional predicted coefficients, the global loss, the mean vector of the global ASR model, and the set of principal directions of the global ASR model. In some implementations, the method further includes updating one or more portions of the global encoder based on comparing the additional loss and the one or more additional predicted coefficients.

In some implementations, updating the one or more portions of the global encoder based on comparing the loss and the one or more predicted coefficients includes freezing the joint network of the global ASR model and freezing the prediction network of the global ASR model.

In some implementations, the global ASR model is a recurrent neural network transformer ("RNN-T") and wherein the client ASR model is an additional RNN-T.

In some implementations, the mean vector of the global ASR model and the set of principal directions of the global ASR model are generated using Bregman PCA.

In some implementations, the client ASR model is stored locally at a client device and wherein the global ASR model is stored at a server remote from the client device.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
distilling information from a global automatic speech recognition ("ASR") model to generate a client ASR model, wherein the global ASR model includes a global encoder, a prediction model, and a joint network, wherein the client ASR model includes a client encoder that is smaller than the global encoder of the global ASR model, the prediction model of the global ASR model, and the joint network of the global ASR model, and wherein distilling the global ASR model to generate the client ASR model comprises:
processing a set of training instances using principal component analysis ("PCA") to generate (a) a mean vector for the set of training instances and (b) a set of principal directions for the set of training instances;
for each of a plurality of training instances in the set of training instances and until one or more conditions are satisfied:
selecting a given training instance, wherein the given training instance includes an instance of audio data capturing a spoken utterance;
processing the instance of audio data capturing the spoken utterance using the client ASR model to generate one or more predicted coefficients corresponding to the given training instance;

processing the instance of audio data capturing the spoken utterance using the global ASR model to generate global output;
generating a loss based on the global output generated based on processing the instance of audio data using the global ASR model, the one or more predicted coefficients generated based on processing the instance of audio data using the client ASR model, the mean vector for the set of training instances generated based on processing the set of training instances using PCA, and the set of principal directions for the set of training instances generated based on processing the set of training instances using PCA; and
updating one or more portions of the client encoder based on comparing the loss and the one or more predicted coefficients.

2. The method of claim 1, further comprising:
processing a further instance of audio data capturing a further spoken utterance using the global ASR model to generate a global text representation of the spoken utterance;
processing the further instance of audio data using the client ASR model to generate a client text representation of the spoken utterance; and
updating one or more portions of the client encoder based on comparing the global text representation of the spoken utterance and the client text representation of the spoken utterance.

3. The method of claim 2, wherein updating the one or more portions of the client encoder based on comparing the global text representation of the spoken utterance and the client text representation of the spoken utterance comprises:
freezing the joint network of the client ASR model and freezing the prediction network of the client ASR model.

4. The method of claim 1, wherein the global ASR model is a recurrent neural network transformer ("RNN-T") and wherein the client ASR model is an additional RNN-T.

5. The method of claim 1, wherein processing the set of training instances using PCA to generate (a) the mean vector for the set of training instances and (b) the set of principal directions for the set of training instances comprises:
processing the set of training instances using Bregman PCA to generate (a) the mean vector for the set of training instances and (b) the set of principal directions for the set of training instances.

6. The method of claim 1, wherein the client ASR model is stored locally at a client device and wherein the global ASR model is stored at a server remote from the client device.

7. The method of claim 6, wherein storage of the global encoder takes a first value of memory, wherein storage of the client encoder takes a second value of memory, and wherein the first value of memory is greater than the second value of memory.

8. The method of claim 1, wherein the global ASR model is initially trained using a set of non-private training data.

9. The method of claim 1, further comprising:
distilling information from the client ASR model to the global ASR model, wherein distilling information from the client ASR model to the global ASR model comprises:
processing an additional instance of audio data capturing an additional spoken utterance using the client ASR model to generate one or more additional predicted coefficients;

generating additional global output based on processing the one or more additional predicted coefficients, the mean vector, and the set of principal directions using the global ASR model;

generating an additional loss based on the one or more additional predicted coefficients, the additional global output, the mean vector, and the set of principal directions; and updating one or more portions of the global encoder based on comparing the additional loss and the one or more additional predicted coefficients.

10. A method implemented by one or more processors, the method comprising:

distilling information from a client automatic speech recognition ("ASR") model to a global ASR model, wherein the client ASR model includes a client encoder, a prediction model, and a joint network, wherein the global ASR model includes a global encoder that is larger than the client encoder of the client ASR model, the prediction model, and the joint network, and wherein distilling information from the client ASR model to the global ASR model comprises:

processing an instance of audio data capturing a spoken utterance using the client ASR model to generate one or more predicted coefficients corresponding to the spoken utterance;

generating global output based on processing the one or more predicted coefficients, a mean vector of the global ASR model, a set of principal directions of the global ASR model using the global ASR model, where the mean vector of the global ASR model and the set of principal directions for the global ASR model are generated using principal component analysis ("PCA");

generating a loss based on the one or more predicted coefficients generated based on processing the instance of audio data using the client ASR model, the global output, the mean vector of the global ASR model generated using PCA, and the set of principal directions of the global ASR model generated using PCA; and updating one or more portions of the global encoder based on comparing the loss and the one or more predicted coefficients.

11. The method of claim 10, further comprising:

distilling information from an additional client ASR model to the global ASR model, wherein distilling information from the additional client ASR model to the global ASR model comprises:

processing an additional instance of audio data capturing an additional spoken utterance using the additional client ASR model to generate one or more additional predicted coefficients corresponding to the additional spoken utterance;

generating additional global output based on processing the one or more additional predicted coefficients, the mean vector of the global ASR model, and the set of principal directions of the global ASR model using the global ASR model;

generating an additional loss based on the one or more additional predicted coefficients, the additional global output, the mean vector of the global ASR model, and the set of principal directions of the global ASR model; and updating one or more portions of the global encoder based on comparing the additional loss and the one or more additional predicted coefficients.

12. The method of claim 10, wherein updating the one or more portions of the global encoder based on comparing the loss and the one or more predicted coefficients comprises:

freezing the joint network of the global ASR model and freezing the prediction network of the global ASR model.

13. The method of claim 10, wherein the global ASR model is a recurrent neural network transformer ("RNN-T") and wherein the client ASR model is an additional RNN-T.

14. The method of claim 10, wherein the mean vector of the global ASR model and the set of principal directions of the global ASR model are generated using Bregman PCA.

15. The method of claim 10, wherein the client ASR model is stored locally at a client device and wherein the global ASR model is stored at a server remote from the client device.

16. A system comprising:

memory storing instructions;

one or more processors operable to execute the instructions to:

distilling information from a global automatic speech recognition ("ASR") model to generate a client ASR model, wherein the global ASR model includes a global encoder, a prediction model, and a joint network, wherein the client ASR model includes a client encoder that is smaller than the global encoder of the global ASR model, the prediction model, and the joint network, and wherein distilling the global ASR model to generate the client ASR model comprises:

processing a set of training instances using principal component analysis ("PCA") to generate (a) a mean vector for the set of training instances and (b) a set of principal directions for the set of training instances;

for each of a plurality of training instances in the set of training instances and until one or more conditions are satisfied:

selecting a given training instance, wherein the given training instance includes an instance of audio data capturing a spoken utterance;

processing the instance of audio data capturing the spoken utterance using the client ASR model to generate one or more predicted coefficients corresponding to the given training instance;

processing the instance of audio data capturing the spoken utterance using the global ASR model to generate global output;

generating a loss based on the global output generated based on processing the instance of audio data using the global ASR model, the one or more predicted coefficients generated based on processing the instance of audio data using the client ASR model, the mean vector for the set of training instances generated based on processing the set of training instances using PCA, and the set of principal directions for the set of training instances generated based on processing the set of training instances using PCA; and updating one or more portions of the client encoder based on comparing the loss and the one or more predicted coefficients.

17. The system of claim 16, wherein one or more of the processors are further operable to execute the instructions to:

processing a further instance of audio data capturing a further spoken utterance using the global ASR model to generate a global text representation of the spoken utterance;

processing the further instance of audio data using the client ASR model to generate a client text representation of the spoken utterance; and updating one or more portions of the client encoder based on comparing the global text representation of the spoken utterance and the client text representation of the spoken utterance.

18. The system of claim 17, wherein updating the one or more portions of the client encoder based on comparing the global text representation of the spoken utterance and the client text representation of the spoken utterance comprises:

freezing the joint network of the client ASR model and freezing the prediction network of the client ASR model.

19. The system of claim 16, wherein the global ASR model is a recurrent neural network transformer ("RNN-T") and wherein the client ASR model is an additional RNN-T.

20. The system of claim 16, wherein processing the set of training instances using PCA to generate (a) the mean vector for the set of training instances and (b) the set of principal directions for the set of training instances comprises:

processing the set of training instances using Bregman PCA to generate (a) the mean vector for the set of training instances and (b) the set of principal directions for the set of training instances.

* * * * *